UNITED STATES PATENT OFFICE.

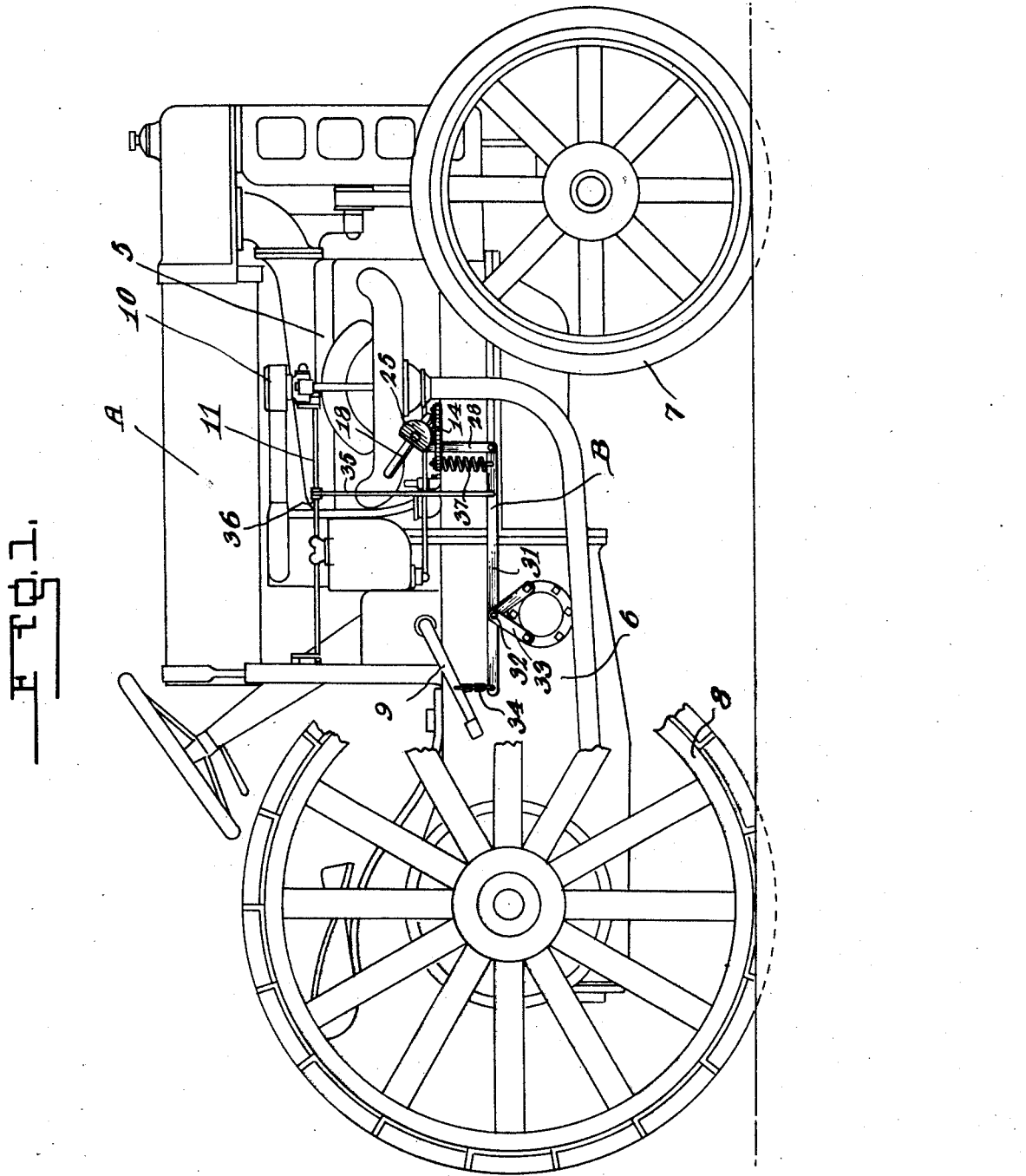

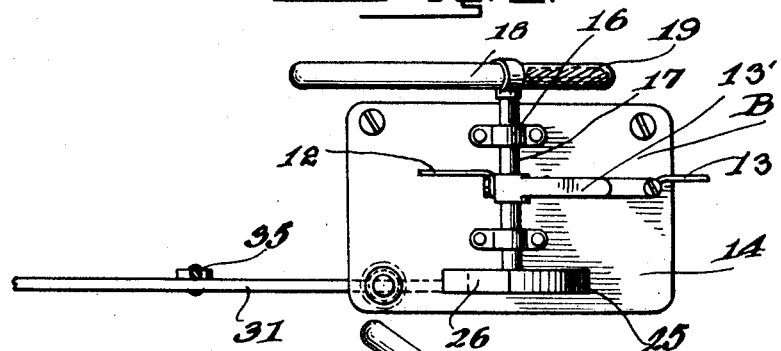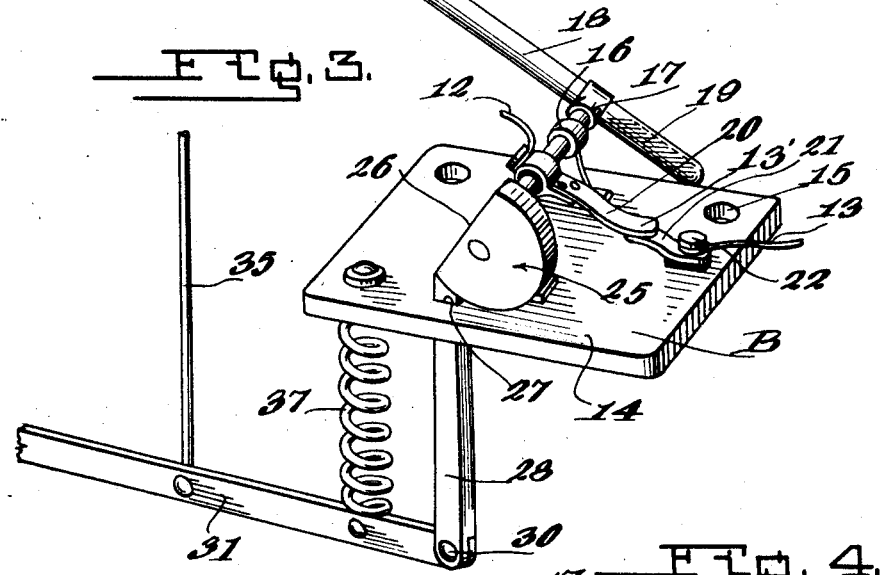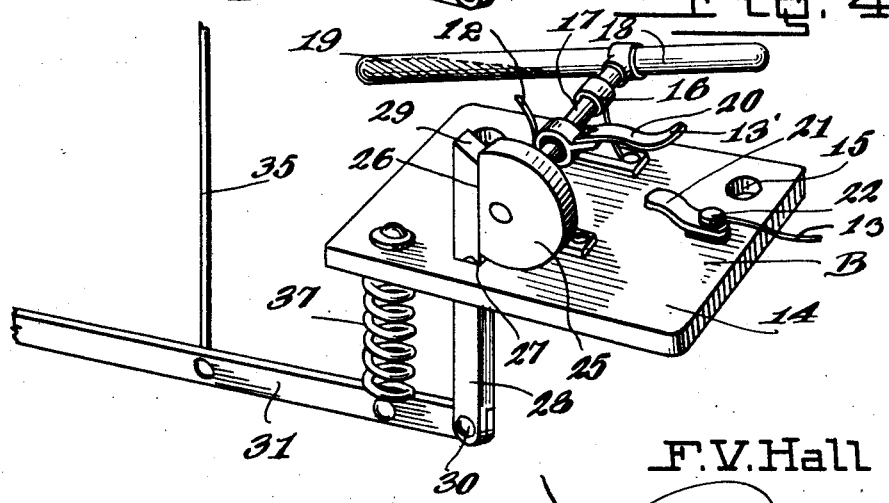

FRED VERNER HALL, OF HOMER, ILLINOIS.

SAFETY CONTROL FOR TRACTORS.

1,414,082.　　　　　　　Specification of Letters Patent.　　Patented Apr. 25, 1922.

Application filed October 2, 1920. Serial No. 414,347.

*To all whom it may concern:*

Be it known that I, FRED V. HALL, a citizen of the United States, residing at Homer, in the county of Champaign and State of Illinois, have invented certain new and useful Improvements in Safety Controls for Tractors, of which the following is a specification.

This invention relates to attachments for tractors and the primary object of the invention is to provide an improved safety device for tractors which will effectively prevent the tractor from turning over backward when pulling a heavy load or the like, thereby preventing injury to the operator and the machine.

Another object of the present invention is to provide an improved tractor attachment which will break the circuit through the ignition mechanism, stop the flow of fuel to the carburetor and throw out the clutch automatically when the tractor assumes a dangerous angle to the horizontal, thereby effectively preventing the operation of the tractor and thus preventing the turning over of the same.

A further object of the invention is the provision of an improved means for connecting the operating lever to the tractor and for operating the lever so that the same will be actuated in such a manner as to cause the automatic stopping of a tractor instantaneously when the front end of the same is raised off the ground.

A still further object of the invention is to provide an improved safety device for tractors of the above character, which is durable and efficient in use, one that is simple and easy to manufacture, and one which can be placed upon the market and incorporated with the tractor at a minimum cost.

With these and other objects in view, the invention consists in the novel construction, arrangement and formation of parts as will be hereinafter more specifically described, claimed and illustrated in the accompanying drawings, forming a part of this specification, in which:

Figure 1 is a side elevation of a tractor illustrating the improved safety attachment incorporated therewith.

Figure 2 is a top plan view of the improved safety attachment, parts of the same being shown in section and broken away.

Figure 3 is a detail perspective view of the improved safety attachment illustrating the normal position of the working parts thereof, and, Figure 4 is a similar view illustrating the position of the working parts thereof when the tractor is inclined at a dangerous angle.

Referring to the drawings in detail, wherein similar reference characters designate corresponding parts throughout the several views, the letter A indicates a tractor, and B, the improved automatic safety attachment therefor.

The tractor A has been shown merely for the purpose of illustrating the use of the invention and may be of any preferred type of make and as shown includes the engine 5, the body 6, the steering and tractor wheels 7 and 8 and the clutch pedal 9. The supply of fuel to the carburetor 10 of the engine 5 is controlled in the usual manner by a valve (not shown) which is actuated by a hand operated longitudinally extending rod 11. This rod 11 is rockably mounted in the ordinary manner. The ignition system for the engine 5 is of the ordinary construction with the exception that wires 12 and 13 are extended to the attachment B and these wires are adapted to be connected to permit the flow of current through the ignition system by means of a switch 13' which forms a part of the device B and will be hereinafter more specifically described.

The improved automatic device B for the tractor comprises a base plate 14 which is bolted or otherwise secured to the engine, preferably below the control rod 11. The inner edge of the base plate 14 has formed adjacent thereto a pair of openings 15 through which the bolts, screws, or other fastening elements are adapted to extend for connecting the base plate to the tractor. A pair of spaced bearings 16 are arranged at the transverse center of the base plate 14 and rockably support the transversely extending shaft 17. The inner end of the shaft 17 supports the elongated cylinder 18 which may be formed of any preferred materials, such as glass, brass or the like. As clearly shown in Figures 3 and 4 of the drawings, the tube or cylinder 18 projects substantially two-thirds of its length from one side of the shaft 17 for a purpose, which will be hereinafter more specifically described. The manner in which the tube or cylinder 18 is connected to the rockable shaft 17 practically divides the same into a relatively short arm, and a relatively long arm. This tube or cylinder has mounted therein mercury or the like 19 and this mercury is normally at rest in the short arm of the tube or cylinder 18 which holds the longer end or arm thereof in a raised position.

The rockable shaft 17 has secured thereto for movement therewith one of the spring contacts 20 of the switch 13. The other spring contact 21 of the switch is secured as at 22 to the base plate 14. Both of the springs contacts 20 and 21 are insulated respectively from the shaft 17 and the base plate 14. When the short end or arm of the cylinder or tube is in its lowered position as shown in Figure 3 of the drawings, the spring contact 20 is in engagement with the stationary spring contact 21 which closes the circuit through the ignition system and thereby permits the normal operation of the motor. The outer end of the shaft 17 has rigidly secured thereto a disc 25 which has a segment cut therefrom which forms a straight edge 26. When the short end or arm of the tube or cylinder 19 is in its lowered position the straight edge 26 of the disc is at an incline to the vertical for a purpose which will also be hereinafter more specifically described. The base plate 14 has an opening 27 formed therein through which is slidably mounted the rod 28. The upper end of this rod 28 is curved as at 29 to conform to the curvature of the periphery of the disc 25. The lower end of the rod 28 has pivotally connected thereto by means of a pivot pin 30 an operating lever 31 which extends longitudinally of the tractor as clearly shown in Figure 1 of the drawings. The operating lever 31 is secured intermediate its ends and adjacent to its innermost end by means of a pivot pin 32 to a bracket 33, and which is bolted or otherwise secured to the tractor body 6 at a convenient point. The innermost end of the operating lever 31 is connected by means of a flexible chain 34 with the clutch pedal 9 for a purpose which will also be hereinafter more specifically described. An upstanding rod 35 is pivotally connected to the lever 31 on the opposite side of the pivot pin 32 from the chain 34. The upper end of the rod 35 is pivotally connected to a crank arm 36 which is rigidly carried by the control rod 11 for the fuel valve of the carburetor 10. A contractile coil spring 37 is secured to the operating lever 31 and to the base plate 14 and normally holds the outer end of the lever in a raised position and the upper end of the rod 28 in engagement with the periphery of the disc 25. It can be seen that when the straight edge 26 of the disc 25 is in a vertical position, the disc is moved out of the path of the rod 28 which will permit the rod to be raised by the coil spring 37. This will lower the inner end of the lever 31 and swing the same on its pivot pin 32.

In operation of the improved safety device for the tractor, when the tractor is in a normal position, the tube or cylinder 18 will be positioned as shown in Figures 1 and 3 of the drawings and the short arm or end thereof will be in a lowered position. If for any reason the forward end of the tractor is raised, the mercury 19 in the tube will flow to the opposite end of the tube and as this is the long end of the tube or cylinder, the weight of the mercury will cause the tube to move and rock the shaft 17. When the shaft 17 is rocked to a position as shown in Figure 4 of the drawings, the straight edge 26 thereof is positioned in a vertical plane, which will permit the rod 28 to raise as heretobefore described. When the shaft 17 is rocked and the rod 28 raises, the same causes the rod 35 to raise which through the medium of the crank 36 rotates the rod 11 and closes the valve of the carburetor 10 which prevents further feeding of fuel thereto. This of course stops the operation of the engine. This rocking movement of the shaft 17 will also carry the movable contact 20 from out of engagement with the stationary contact 21 which opens the circuit through the ignition system and further prevents the firing of the cylinder. This is the second means of preventing the operation of the engine and stopping the motion of the tractor. Owing to the pivoting of the operating lever 31, the inner or rear end thereof will lower as the forward or outer end thereof raises. As the inner or rear end of the lever lowers, the same will pull down on the clutch pedal 9 through the medium of the flexible chain 34 which will throw out the clutch and thus prevent the rotation of the ground tractor wheels 8 which will further prevent the forward motion of the tractor. This is a further means for preventing the forward motion of the tractor.

The operation of the safety control device for tractors is automatic and instantaneous in its operation and as soon as the tube or cylinder 18 is rocked, the motor is stopped and the clutch is thrown out which stops the forward movement of the tractor and permits the same to resume its normal position. This absolutely precludes the operation of the tractor and prevents the same from turning over backwards on the operator.

The spring 37 is formed relatively heavy so that the operation of the pedal 9 is assured. Owing to the flexible connection 34 between the operating lever 31 and the pedal 9, the normal operation of the pedal 9 by the operator is permitted without the operation of the lever 31 and associated parts of the safety control attachment.

From the foregoing description it can be seen that an exceptionally simple means has been provided for preventing the turning over of a tractor.

Changes in details may be made without departing from the spirit or scope of this invention; but,

I claim:

1. The combination with a tractor including an engine, an ignition system and carburetor therefor, a clutch pedal, and a control rod for the carburetor, of a safety attachment for the tractor comprising means for opening the circuit through the ignition system, and for operating the clutch pedal and fuel control rod for the carburetor when the tractor assumes a dangerous angle to the horizontal.

2. The combination with a tractor including an engine having an ignition system, a carburetor and a control fuel valve operating rod and a clutch pedal, of an automatic safety control device for the tractor including a swingable rockable member, a weight arranged in said member for rocking the same when the tractor assumes a dangerous angle, and means operated by said rockable member for opening the ignition circuit, for operating the clutch pedal and the control fuel valve operating rod.

3. In an automatic stopping device for tractors, a tractor including an engine having an ignition system, a carburetor, and a control fuel operating rod for the carburetor, and a clutch pedal, of a cylinder mounted for rocking movement on the tractor, a weight slidably associated with the cylinder for rocking the same when the tractor assumes a dangerous angle to the horizontal, an operating lever, means for permitting the actuation of the lever upon the rocking of the cylinder, and means operatively connecting the operating lever with the control fuel operating rod of the carburetor, the clutch pedal and the ignition system.

4. The combination with a tractor including a clutch pedal, an operating lever pivotally secured intermediate its ends to the tractor, means connecting one end of the lever to the clutch pedal, means for normally urging the other end of the lever to a raised position, means interposed in the path of the lever for preventing the upward movement of the lever and adapted to be moved out of the path of the lever when the tractor assumes a dangerous angle to the horizontal.

5. The combination with a tractor including a clutch pedal, of a safety control device for the tractor including a lever pivotally secured to the tractor intermediate its ends, flexible means connecting one end of the lever with the clutch pedal, spring means normally urging the other end of the lever to a raised position for operating the clutch lever to throw out the clutch, a sliding rod carried by the end of the lever opposite to the end connected to the clutch pedal, a member normally positioned in the path of the rod for preventing the upward movement of that end of the lever, and a cylinder operatively connected to said last mentioned member and a weight slidably mounted in said cylinder for operating the same to move the member out of the path of the rod when the tractor assumes a dangerous position to the horizontal.

6. The combination with a tractor including an engine having a carburetor and a control rod for the fuel valve thereof, of a safety attachment for the tractor including a lever pivotally mounted intermediate its ends to said tractor, means normally urging one end of the lever to a raised position, means normally holding the lever in a lowered position, a rockable gravity operated means for moving the last mentioned means to permit the mentioned end of the lever to raise, and a rod operatively connecting the lever with the control rod for the fuel valve of the carburetor.

7. The combination with a tractor including an engine having a carburetor and a rockable rod for the fuel valve of the carburetor, and a clutch pedal, of an operating lever pivotally mounted intermediate its ends to said tractor, a flexible chain connecting one end of the lever to the clutch pedal, spring means normally tending to rock said lever, a rod operatively connected to said lever and to said rockable rod for the fuel valve, a sliding rod carried by the outer end of the lever, a latch disposed in the path of said rod for preventing rocking movement of said lever, and gravity operated means for moving said latch member out of the path of the rod when the tractor assumes a dangerous angle to the horizontal.

8. The combination with a tractor including an engine having an ignition system, a switch interposed in the system, including a stationary contact and a movable contact, of a safety control device for the tractor including a rocking shaft, means securing the movable contact to said shaft, a cylinder secured to said shaft, and a sliding weight mounted in said cylinder for rocking said shaft when the tractor assumes a dangerous angle to the horizontal, whereby the movable contact will be moved out of engagement with the stationary contact.

9. A safety device for tractors comprising a base plate, a shaft rotatably carried by the base plate, a cylinder secured to said shaft, the cylinder having a relatively long and a relatively short arm, a sliding weight mounted in said cylinder, a latch member secured to said shaft, a spring stationary contact secured to the base plate, a movable contact secured to the shaft adapted to be brought into and out of engagement with the stationary contact, a lever pivotally secured intermediate its ends, a spring connected to the outer end of the lever and to said base plate, a sliding rod pivotally secured to the outer end of the lever and slidably carried by the base plate and disposed in the path of the latch member.

FRED VERNER HALL.